(12) United States Patent
Sekime et al.

(10) Patent No.: US 6,271,905 B1
(45) Date of Patent: Aug. 7, 2001

(54) REFLECTIVE LIQUID CRYSTAL DISPLAY DEVICE

(75) Inventors: Tomoaki Sekime, Kanazawa; Hisanori Yamaguchi, Ishikawa-gun; Yoshio Iwai, Kanazawa, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/382,147

(22) Filed: Aug. 24, 1999

(30) Foreign Application Priority Data

Aug. 24, 1998 (JP) ................................................. 10-237662

(51) Int. Cl.⁷ .................................................. G02F 1/1335
(52) U.S. Cl. .............................. 349/117; 349/118; 349/121
(58) Field of Search ..................................... 349/117, 118, 349/119, 120, 121, 136

(56) References Cited

U.S. PATENT DOCUMENTS

| | | | | |
|---|---|---|---|---|
| 5,519,523 | * | 5/1996 | Madokoro et al. | 359/73 |
| 5,574,593 | * | 11/1996 | Wakita et al. | 359/259 |
| 5,602,661 | * | 2/1997 | Schadt et al. | 349/124 |
| 5,805,253 | * | 9/1998 | Mori et al. | 349/118 |
| 5,982,463 | * | 11/1999 | Yamaguchi et al. | 349/99 |
| 6,084,652 | * | 7/2000 | Yamahara et al. | 349/136 |
| 6,130,735 | * | 10/2000 | Hatanaka et al. | 349/113 |

FOREIGN PATENT DOCUMENTS

| | | | |
|---|---|---|---|
| 0-470817-A2 | * | 2/1992 | (EP) . |
| 6-167708 | | 6/1994 | (JP) . |
| 6-175125 | | 6/1994 | (JP) . |
| 6-301006 | | 10/1994 | (JP) . |
| 6-308481 | | 11/1994 | (JP) . |
| 7-84252 | | 3/1995 | (JP) . |
| 7-146469 | | 6/1995 | (JP) . |
| 8-136913 | * | 5/1996 | (JP) . |
| 9-50025 | * | 2/1997 | (JP) . |
| 10-96914 | * | 4/1998 | (JP) . |
| 10-161110 | * | 6/1998 | (JP) . |

* cited by examiner

Primary Examiner—William L. Sikes
Assistant Examiner—Tarifur R. Chowdhury
(74) Attorney, Agent, or Firm—Parkhurst & Wendel, LLP

(57) ABSTRACT

A reflective liquid crystal display device employing only one sheet of polarizer film. An optical compensator of a hybrid tilt type having retardation $r_c$ is disposed between a liquid crystal cell and the polarizer film disposed only on one side of the liquid crystal cell. When an effective voltage $v_{on}$ is applied to the liquid crystal cell, the retardation $r_c$ of the optical compensator is determined to accomplish the following relation:

$$r_{on} + r_c = \lambda/4 + m \cdot \lambda/2 \, (m=0, 1, 2 \ldots)$$

Or $$r_{on} + r_c = (m+1) \cdot \lambda/2 \, (m=0, 1, 2 \ldots)$$

where $r_{on}$ is retardation of the liquid crystal layer and $\lambda$ is the optical wavelength. This disclosure enables the a reflective liquid crystal display device with brighter white display, higher contrast, achromatic monochrome display, and broader viewing angle to be constructed.

3 Claims, 6 Drawing Sheets

$nx > ny \approx nz$

REFLECTIVE LIQUID CRYSTAL DISPLAY DEVICE

FIELD OF THE INVENTION

The present invention relates to the field of a reflective liquid crystal display (LCD) device, and more particularly, to a reflective LCD device having a polarizer film only on one side of a liquid crystal cell.

BACKGROUND OF THE INVENTION

Thin and light liquid crystal display (LCD) devices are being employed in a widening range of applications including displays for mobile information terminals. An LCD device is a passive device which does not emit light itself but changes its light transmittance and can thus be used in displays. The LCD device requires a very low driving voltage of just a few volts. In a LCD device, a reflector is provided underneath the LCD device to display information by taking advantage of the reflection of external light, dispensing with the need to provide power for background lighting. The result is a display device with an extremely low power consumption.

A conventional reflective color LCD device comprises a liquid crystal cell with a color filter, and a pair of polarizer films disposed to sandwich the liquid crystal cell. The color filter is provided on one substrate of the liquid crystal cell, and a transparent electrode is further formed on the color filter. Color information may be displayed by applying voltage to the liquid crystal cell to change the orientation of liquid crystal molecules and controlling the light transmittance of the color filter for each color.

The light transmittance of one polarizer film is only about 45%. Transmittance of polarized light parallel to the absorption axis of the polarizer film is about 0%, and transmittance of polarized light perpendicular to the absorption axis is about 90%. In a reflective LCD device employing two polarizer films, the light passes through the polarizer film four times. Accordingly, the light usage rate of a conventional type of LCD device will be as follows when the light absorbed by the color filter is ignored:

$$(0.9)^4 \times 50\% = 32.8\%.$$

This shows that the light usage rate is a maximum of about 33% even for a monochrome LCD panel which does not use the color filter. If the color filter is added to this type of LCD to create a color display, its light usage rate further drops, resulting in an inability to achieve sufficient brightness for practical use.

To achieve a brighter display, several configurations are proposed concerning the provision of only one polarizer film on the upper surface of the liquid crystal cell, and sandwiching the liquid crystal cell between this single polarizer film and a reflector. (For example, refer to Japanese laid-open patent application nos. H7-146469 and H7-84252). In this case, the light passes through the polarizer film only twice. If the light absorption at the color filter is ignored, the light usage rate will be as follows:

$$(0.9)^2 \times 50\% = 40.5\%$$

Compared to the configuration of using two sheets of polarizer film, the light usage rate may be improved by a maximum of about 23.5%. However, since only one sheet of polarizer film is used, an achromatic display of black and white is difficult to achieve. In particular, it may be difficult to display black, the low reflective achromatic color.

Other conventional types include a reflective color LCD device using the birefringence of a twisted nematic liquid crystal layer and a polarizer film for color display (Japanese laid-open patent application no. H6-308481) which eliminates the use of a color filter, and a color LCD device using the birefringence of a liquid crystal layer and phase difference film (Japanese laid-open patent application nos. H6-175125 and H6-301006). These types of LCD devices enable the achievement of reflectance at a practical brightness even if two sheets of polarizer film are used, since no color filter is required. However, a birefringent color display is theoretically difficult to apply to multi-level gradation and multicolor displays such as when displaying 16 level gradations of 4096 colors and full color of 64 level gradations. In addition, the color purity and color reproducible range are narrow.

SUMMARY OF THE INVENTION

The present invention provides a reflective liquid crystal display device having only one sheet of polarizer film which enables the display of monochrome achromatic colors with a bright white display and high contrast, and multi-level gradation colors.

A reflective LCD device of the present invention comprises a liquid crystal cell having a liquid crystal layer between a pair of substrates.

One sheet of polarizer film disposed on one substrate sandwiching the liquid crystal layer; and An optical reflector disposed on the other substrate sandwiching the liquid crystal layer.

Wherein an optical compensator of the hybrid tilt type, having the optical slow axis when the optical compensator is seen from its normal direction, is disposed between the polarizer film and liquid crystal cell.

Retardation $r_c$ of the optical compensator is determined to accomplish the following relation:

$$r_{on} + r_c = \lambda/4 + m \cdot \lambda/2 \, (m = 0, 1, 2 \ldots),$$

Or $$r_{on} + r_c = (m+1) \cdot \lambda/2 \, (m = 0, 1, 2 \ldots),$$

where $r_{on}$ is retardation of the liquid crystal layer when the effective voltage $v_{on}$ is applied to the liquid crystal cell, and the optical wavelength is $\lambda$.

This configuration offers a brighter normally white or normally black reflective LCD device which enables achromatic change from black to white, and a low change in reflectance in proportion to viewing angle.

The optical compensator is preferably a positive hybrid tilt type whose refractive indexes nx, ny, and nz satisfy the relation of nx>ny≈nz, and the direction of ny is in the in-plane direction of the optical compensator. When the optical compensator is seen from the direction of ny, nx is tilted from 0° to 10° on one side and 60° to 90° on the other side of the optical compensator, and the tilt angle continuously changes in between these angles. This configuration further reduces dependency of the reflectance characteristics on the viewing angle.

The optical compensator may also preferably be a negative hybrid tilt type whose refractive indexes nx, ny, and nz satisfy the relation of nx≈ny>nz, and the direction of ny is in the in-plane direction of the optical compensator. When the optical compensator is seen from the direction of ny, nz is tilted from 0° to 10° on one side and 60° to 90° on the other side of the optical compensator, and the tilt angle continuously changes between these angles. This configuration also further reduces dependency of the reflectance characteristics on the viewing angle.

The liquid crystal layer may preferably contain nematic liquid crystal having positive dielectric constant anisotropy, and its $r_{on}$ value preferably satisfies:

$$10 \text{ nm} < r_{on} \leq 50 \text{ nm}$$

With this configuration, better characteristics with high contrast may be achieved. It is preferable to satisfy:

$$20 \text{ nm} < r_{on} \leq 40 \text{ nm}$$

This configuration offers good characteristics particularly with high contrast.

The liquid crystal layer may also preferably contain nematic liquid crystal with negative dielectric constant anisotropy, and its $r_{on}$ value may preferably satisfy:

$$220 \text{ nm} < r_{on} \leq 260 \text{ nm}$$

With this configuration, further better characteristics with high contrast may be achieved. It is further preferable to satisfy:

$$230 \text{ nm} < r_{on} \leq 250 \text{ nm}$$

This configuration offers good characteristics with particularly high contrast.

BRIEF DESCRIPTION OF THE DRAWINGS

FIG. 2(a) is a schematic view of refractive indexes, and FIG. 2(b) is a sectional schematic view of the optical compensator seen from the ny direction.

FIG. 4(a) shows the reflectance characteristic when changing the viewing angle rightward. FIG. 4(b) shows the reflectance characteristic when changing the viewing angle downward

FIG. 6(a) is a schematic view of refractive indexes, and FIG. 6(b) is a sectional schematic view of the optical compensator seen from the ny direction.

DESCRIPTION OF THE PREFERRED EMBODIMENTS

First Exemplary Embodiment

Figure 1:
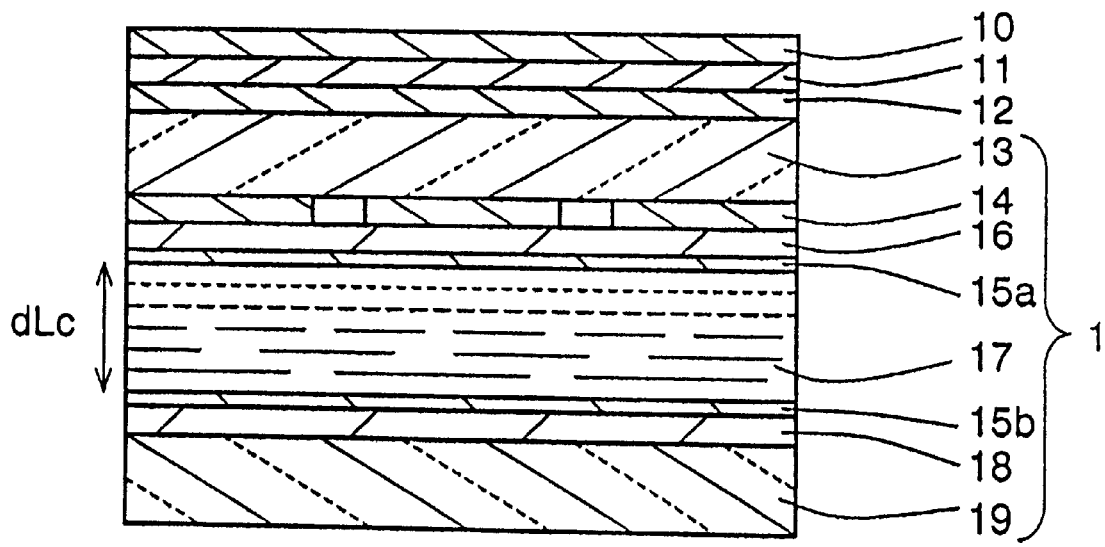
FIG. 1 is a brief configuration of a reflective LCD device in accordance with a first exemplary embodiment of the present invention.

FIG. 1 is a sectional view illustrating a brief configuration of a reflective LCD device in a first exemplary embodiment. The reflective LCD device in the first exemplary embodiment is created by laminating scattering film layer 12, optical compensator 11, and polarizer film 10 in this order onto one face of a liquid crystal cell 1.

The liquid crystal cell 1 comprises an upper transparent substrate 13 and lower substrate 19. A color filter layer 14, transparent electrode 16, and orientation layer 15a are provided on the upper transparent substrate 13. A reflective metal electrode 18 and orientation layer 15b are provided on the lower substrate 19. Liquid crystal is enclosed between the orientation layers 15a and 15b to form a liquid crystal layer 17. The lower substrate 19 does not need to be transparent.

The process for manufacturing the above reflective LCD device is described next.

The upper transparent substrate 13 and lower substrate 19 are made of non-alkaline glass substrate (e.g. 1737, Corning, Inc.). The color filter layer 14 consisting of red, green, and blue stripes is formed by a photo-lithography process onto the upper transparent substrate 13 using pigment dispersed materials. Then, the transparent electrode 16 is formed on the color filter 14 as a pixel electrode using indium-tin-oxide (ito).

On the lower substrate 19, titanium is deposited to a thickness of 80 nm, and then aluminum to a thickness of 200 nm to form a reflective mirror metal electrode 18. The reflective mirror metal electrode 18 has the advantage of achieving uniform orientation.

On the transparent electrode 16 and reflective metal electrode 18, 5 wt % of polyimide solution dissolved in γ-butyrolactone is printed and cured at 250°. To achieve a predetermined twisting angle, orientation is created by a rotary rubbing method, which uses a rayon cloth to form the orientation layers 15a and 15b.

At the periphery of the surface of the upper transparent substrate 13, a thermosetting sealing resin is printed, into which 1.0 wt % of glass fiber with a predetermined diameter is mixed (e.g. STRUCT BOND, Mitsui Toatsu Chemicals). On the lower substrate 19, resin beads with a predetermined diameter are scattered at the ratio of 100 to 200 beads/mm$^2$.

After the upper transparent substrate 13 and lower substrate 19 are mutually bonded, and the sealing resin is cured at 150°, liquid crystal is vacuum injected between substrates 13 and 19 to form the liquid crystal layer 17. As for liquid crystal, the first exemplary embodiment employs fluorocarbon ester type nematic liquid crystal with refractive anisotropy of $\Delta n_{LC}$=0.08 which is mixed with chiral liquid crystal to adjust the chiral pitch to 80 μm. After injecting liquid crystal, the inlet is sealed with an ultraviolet curable resin, and cured by exposing the resin to ultraviolet radiation.

On the upper transparent substrate 13 of the liquid cell 1 as formed above, an isotropic forward scattering film is attached as the scattering film layer 12. The optical compensator 11 is attached on the scattering film layer 12 in a way to set the optical slow axis to a predetermined angle.

Then, a neutral gray polarizer film (sq-1852ap, Sumitomo Chemical Industries Co., Ltd.) pre-treated for antiglare (ag) and antireflection (ar), is attached on the optical compensator 11 so that the absorption axis of the polarizer film makes a predetermined angle with the optical slow axis of the optical compensator 11.

Retardation $r_c$ of the optical compensator 11 is determined to accomplish the following relation:

$$r_{on}+r_c=\lambda/4+m\cdot\lambda/2 (m=0, 1, 2 \ldots)$$

where $r_{on}$ is retardation of the liquid crystal when the effective voltage $v_{on}$ is applied to the liquid crystal cell 1, and the optical wavelength is $\lambda$.

This relation is preferably satisfied in the visible wavelengths (380 nm$\leq\lambda\leq$780 nm).

Here, since the retardation $r_{on}$ of the liquid crystal when the effective voltage $v_{on}$=5 v is applied to the liquid crystal cell 1 was 40 nm, and when m=0, the retardation of the optical compensator 11 is adjusted to $r_c$=98 nm. This enables a normally white reflective LCD device with high contrast to be achieved.

If the liquid crystal layer contains nematic liquid crystal with positive dielectric constant anisotropy, as in this exemplary embodiment, the retardation $r_{on}$ of liquid crystal is preferably as follows to achieve good characteristics with high contrast:

$$10 \text{ nm} < r_{on} \leq 50 \text{ nm}$$

It is further preferable to satisfy:

$$20 \text{ nm} < r_{on} \leq 40 \text{ nm}$$

Figure 2A:
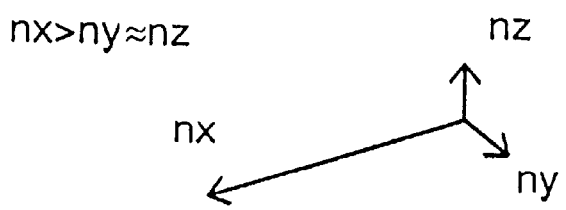
FIGS. 2(a) and 2(b) illustrate an optical compensator of the reflective LCD device in accordance with the first exemplary embodiment of the present invention.
Figure 2B:
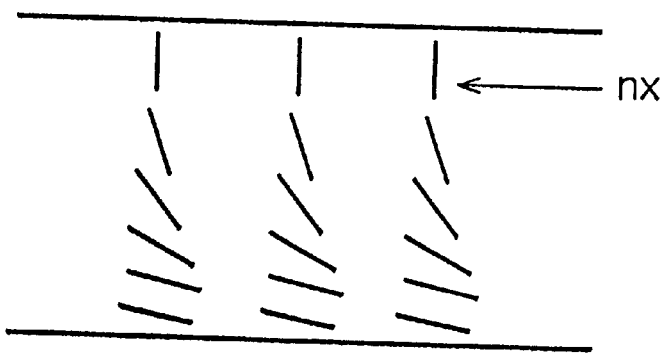

The optical compensator 11 employed in this exemplary embodiment is a positive hybrid tilt type which is configured with uni-axial optical medium whose refractive indexes nx, ny, and nz demonstrate positive optical anisotropy satisfying the relation of nx>ny≈nz as shown in FIG. 2(a). The direction of its optical axis, i.e., nx, is continuously tilted along the thickness of the optical compensator 11 as shown in FIG. 2(b). The direction of ny is toward a certain direction in the face of the optical compensator 11. More specifically, ny is configured in the vertical direction to the sheet of FIG. 2(b). Accordingly, the optical compensator 11 has its optical slow axis parallel to the sheet of FIG. 2(b) in its face when the optical compensator 11 is seen from its normal direction. When this optical compensator 11 is seen from the ny direction, nx is tilted to 5° on one face and 90° on the other face of the optical compensator 11, as shown in FIG. 2(b), and the tilt angle continuously changes between these angles. The tilt angle of the refractive index nx is not limited to these angles. However, the tilt angle should preferably fall within 0° to 10° on one face and 60° to 90° on the other face of the optical compensator 11.

This type of optical compensator 11 may also be created in the following way. First, one of the two glass substrates is provided with a vertical orientation film, and the other glass substrate is given a horizontal orientation film in one direction by rotary rubbing. These two glass substrates are then mutually bonded, and nematic liquid crystal is injected between them. The use of this type of optical compensator offers a normally white reflective LCD device which displays black and white in achromatic color, at high contrast, and with a low change in reflectance in proportion to the viewing angle.

The liquid crystal cell 1 in this exemplary embodiment employs liquid crystal with dielectric constant anisotropy $\Delta\epsilon$=5.0, and the thickness of the liquid crystal layer $d_{lc}$=3.0 μm so that $\Delta n_{lc}\cdot d_{lc}$=0.24 μm is achieved.

The bisector of the larger angle between
 i) the angle created by the direction of the liquid crystal molecules closest to one of the upper transparent substrate 13 and the lower substrate 19, and
 ii) the angle created by the direction of the liquid crystal molecules closest to the other of the upper transparent substrate 13 and lower substrate 19 is determined as a reference line within the substrate face.

The twisting direction of the nematic liquid crystals of the liquid crystal layer 17 from one substrate to the other substrate is considered as a positive direction. An angle created by the reference line and the direction of the absorption axis of the polarizer film 10 is considered as $\phi_p$. An angle created by the reference line and the optical slow axis of the optical compensator 11 is considered as $\phi_f$. If a twisting angle $\Omega_{1c}$=63.0°, $\phi_p$=45.0°, and $\phi_f$=90.0° are achieved, a normally white reflective LCD device with high contrast is obtained.

Next, measurement results of optical characteristics under the above conditions are shown below. The reflectance was measured using a perfect diffuse light source.

Figure 3:
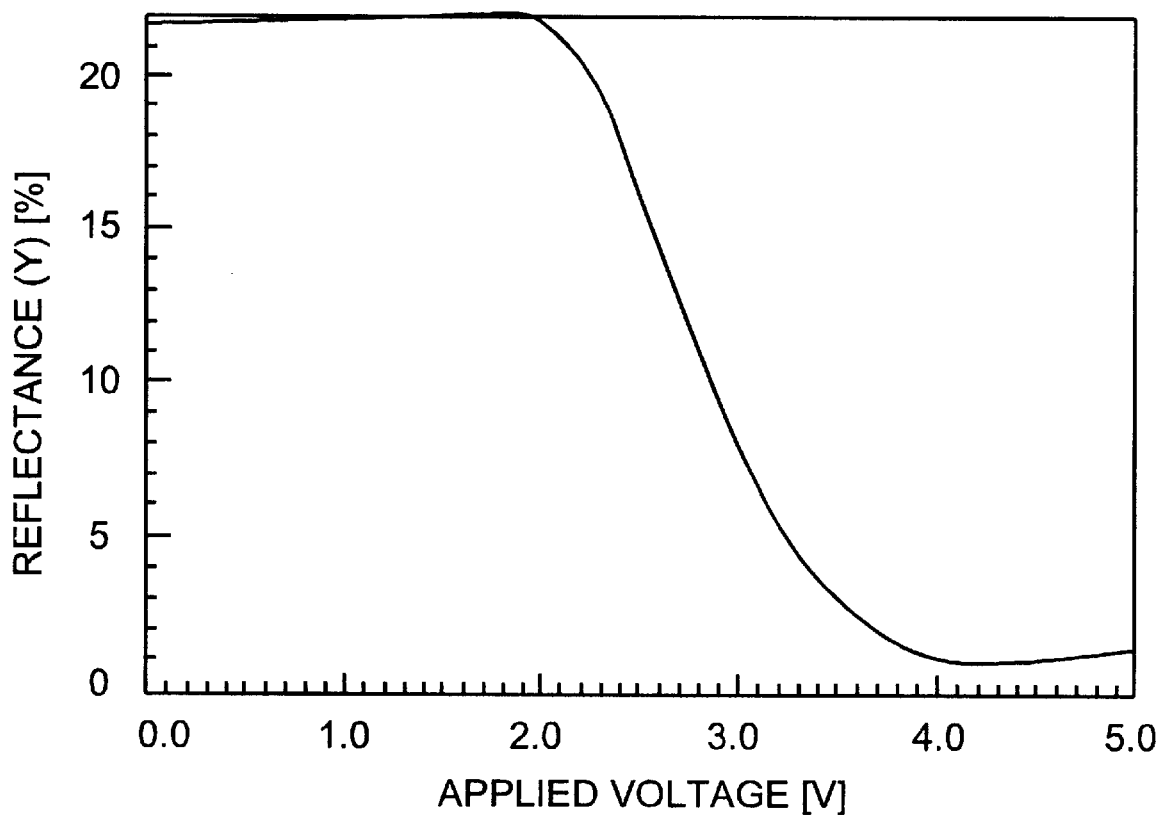
FIG. 3 illustrates the relation between the reflectance and applied voltage in the reflective LCD device in accordance with the first exemplary embodiment of the present invention.

FIG. 3 shows the relation between the reflectance of the reflective LCD device in the first exemplary embodiment and applied voltage. When observing the reflective LCD device from the front, which is the normal direction, the reflectance was 22.1%, and contrast was 22.0%. The reflectance mentioned in the specification refers to the brightness when white is displayed in the LCD device, assuming the reflectance of standard white plate as 100%, being expressed by converting into the value of y in xyz colorimetric system. Since the color achromatically changes from black to white, the feasibility of a 64 level gradations color display was confirmed.

Figure 4A:
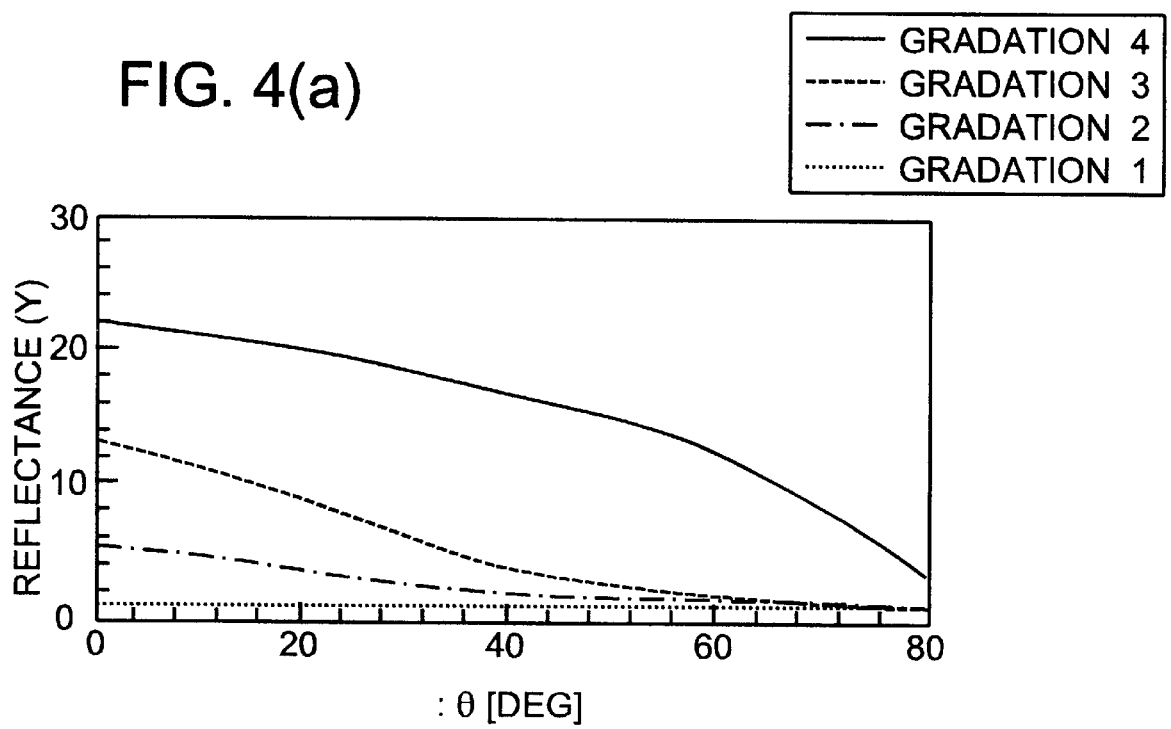
FIGS. 4(a) and 4(b) illustrate the reflectance characteristic of the reflective LCD device in accordance with the first exemplary embodiment of the present invention.
Figure 4B:
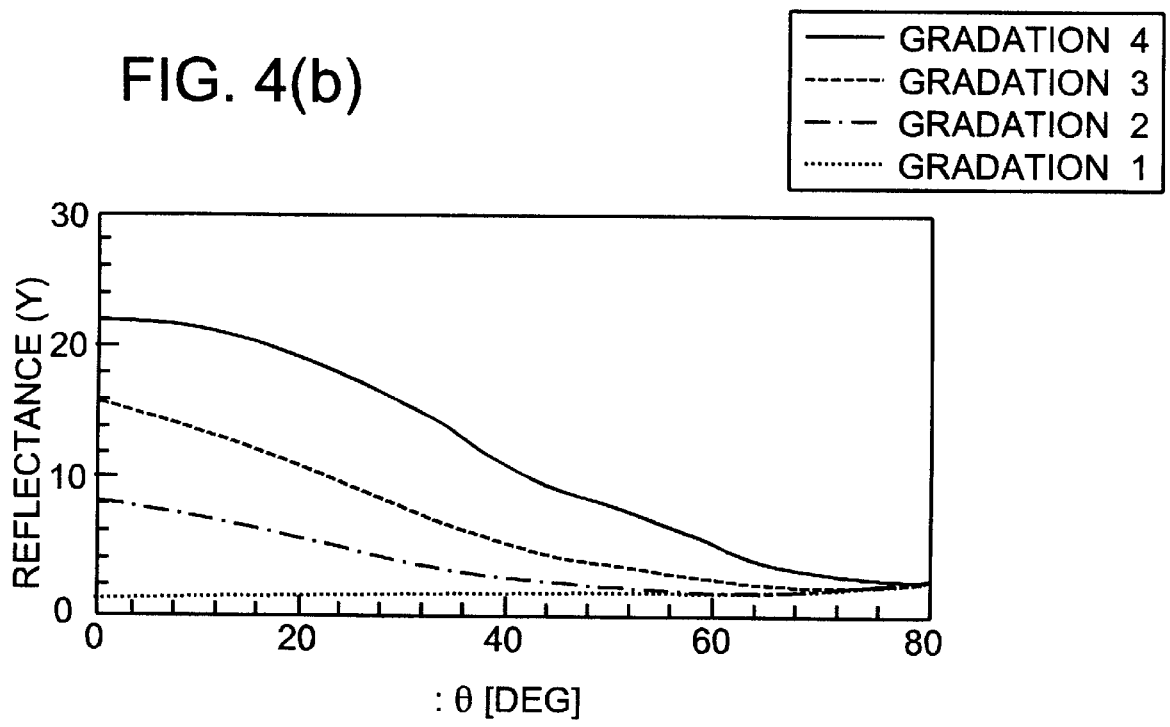

FIGS. 4(a) and 4(b) show the characteristics of the reflectance when the viewing angle is moved to the right and bottom, respectively, in the reflective LCD device of the first exemplary embodiment. FIGS. 4(a) and 4(b) show the reflectance at four gradations. The polar angle θ is the observation angle when the normal direction of the panel is set to 0. It shows no inversion of the gradation until a 60° change in the viewing angle to the right and bottom, thus demonstrating good viewing angle characteristics. In particular, for changes in the right-hand direction, there was less change in the viewing angle of the white reflectance, also demonstrating good viewing angle characteristics.

For comparison, the reflective LCD device of the first exemplary embodiment without a color filter layer 14 was created. When observed from the front, the contrast was 23.1%, and the reflectance was 38.1%.

The liquid crystal twisting angle $\Omega_{1c}$ was then changed to examine its characteristics. It was confirmed that the reflective LCD device in this exemplary embodiment of the present invention demonstrates good characteristics when the twisting angle was between 0° and 90°. Characteristics are particularly good when the twisting angle $\Omega_{1c}$ was between 60° and 70°.

The reflective LCD device of the first exemplary embodiment achieved a brighter display by providing the scattering film layer 12 to condense the ambient light. Since the scattering film layer 12 is provided on only one side of the liquid crystal cell 1, blurring of the display image may be suppressed. In addition, the use of a forward scattering film as the scattering film layer 12 enables the further improvement of the light usage rate. As for the scattering film, the use of a film with a strong forward scattering characteristic but a negligible backward scattering characteristic is preferable.

In the above description, the liquid crystal cell 1 is a twisted nematic liquid crystal cell. However, it is apparent that other types of liquid crystal cell are applicable to this invention. For example, if a homogeneous liquid crystal cell is used as the liquid crystal cell 1, characteristics as good as those of the twisted nematic liquid crystal may be achieved by setting the retardation of the optical compensator 11 to $r_c=107$ nm. If the liquid crystal cell 1 is a hybrid alignment nematic liquid crystal cell, and retardation of the optical compensator 11 is adjusted to $r_c=115$ nm, characteristics as good as those of the twisted nematic liquid crystal are achievable.

In the above configurations, the scattering film layer 12 is disposed between the optical compensator 11 and upper transparent substrate 13. The same characteristics are achievable if the scattering film layer 12 is disposed on the polarizer film 10 or between the polarizer film 10 and optical compensator 11.

In this exemplary embodiment, aluminum is used as the reflective metal electrode. However, the material comprising the electrode is not limited to aluminum. For example, the same effect is achievable by the use of silver for the reflective metal electrode.

Second Exemplary Embodiment

Figure 5:
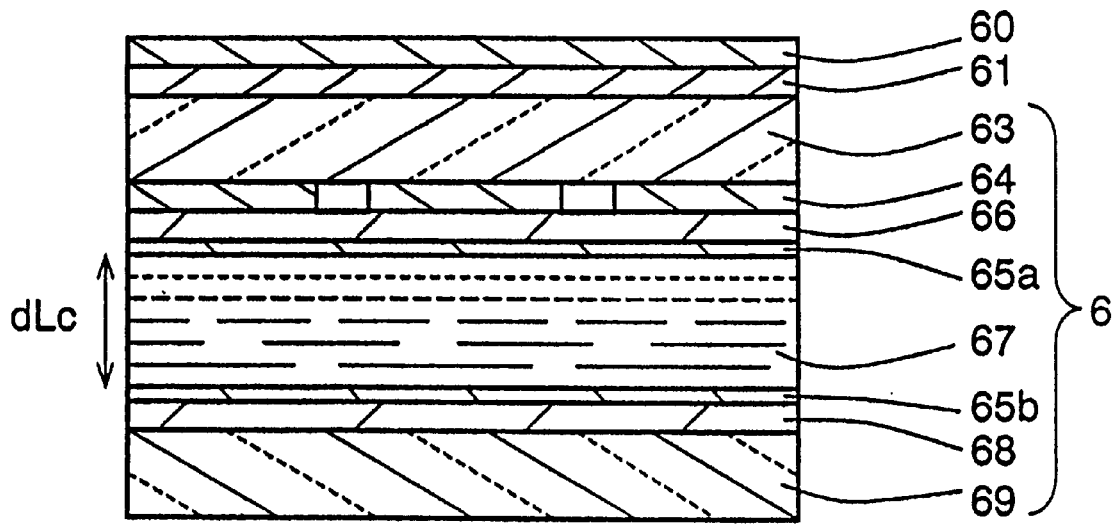
FIG. 5 is a brief configuration of a reflective LCD device in accordance with a second exemplary embodiment of the present invention.

FIG. 5 is a sectional view illustrating a brief configuration of a reflective LCD device in a second exemplary embodiment of the present invention. The reflective LCD device is created by laminating an optical compensator 61 and polarizer film 60 on one side of a liquid crystal cell 6 in the above order. Points that differ from the first exemplary embodiment are that i) the reflective metal electrode has a scattering function, eliminating the need for a scattering film layer, and ii) a negative hybrid tilt type is employed as the optical compensator.

The liquid crystal cell 6 comprises an upper transparent substrate 63 and lower substrate 69. A color filter layer 64, transparent electrode 66, and orientation layer 65a are provided on the upper transparent substrate 63. A reflective metal electrode 68 and orientation layer 65b are provided on the lower substrate 69. Liquid crystal is enclosed between the orientation layers 65a and 65b to form a liquid crystal layer 67. The lower substrate 69 is not required to be transparent.

The process for manufacturing this reflective liquid crystal device is similar to that of the first exemplary embodiment. However, after titanium and aluminum are deposited on the lower substrate 69, its surface is roughened. to an average tilt angle of 3° to 12° to create a reflective metal electrode 68 of diffuse reflection type. Using a diffuse reflection type reflective metal electrode terminates the need for a scattering film.

Also in this exemplary embodiment, retardation $r_c$ of the optical compensator 61 is determined to accomplish the following relation:

$$r_{on}+r_c=\lambda/4+m\cdot\lambda/2 (m=0, 1, 2 \ldots)$$

where $r_{on}$ is retardation of the liquid crystal when the effective voltage $v_{on}$ is applied to the liquid crystal cell 6, and the optical wavelength is $\lambda$.

This relation is preferably satisfied in the visible wavelengths (380 nm $\leq \lambda \leq$ 780 nm).

Here, since the retardation $r_{on}$ of the liquid crystal when the effective voltage $v_{on}=5$ v is applied to the liquid crystal cell 6 is 33 nm and when m=0, retardation $r_c$ of the optical compensator 11 is adjusted to $r_c=105$ nm. This enables a normally white reflective LCD device with high contrast to be achieved.

Figure 6A:
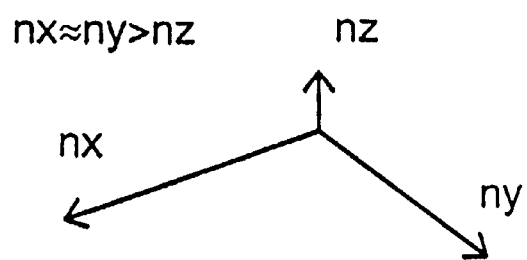
FIGS. 6(a) and 6(b) illustrate an optical compensator of the reflective LCD device in accordance with the second exemplary embodiment of the present invention.
Figure 6B:
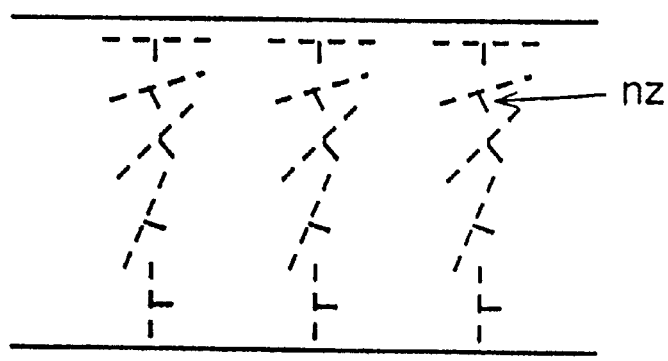

The optical compensator 61 employed in this exemplary embodiment is a negative hybrid tilt type which is configured with uniaxial optical medium whose refractive indexes nx, ny, and nz demonstrate negative optical anisotropy satisfying the relation of nx≈ny>nz as shown in FIG. 6(a). The direction of the optical axis, i.e., nz, is continuously tilted along the thickness of the optical compensator 61 as shown in FIG. 6(b). The direction of ny is toward a certain direction in the face of the optical compensator 11. More specifically, ny is configured in the vertical direction to the sheet of FIG. 6(b). Accordingly, the optical compensator 61 has its optical slow axis parallel to the sheet of FIG. 6(b) in its face when the optical compensator 61 is seen from its normal direction. When this optical compensator 61 is seen from the ny direction, nz is tilted to 5° on one face and 90° on the other face of the optical compensator 61, as shown in FIG. 6(b), and the tilt angle continuously changes between these angles. The tilt angle of the refractive index nz is not limited to these angles. However, the tilt angle preferably falls within 0° to 10° on one face and 60° to 90° on the other face of the optical compensator 61.

For the above liquid crystal cell 6, liquid crystal with dielectric constant anisotropy of $\Delta\in=4.9$ is employed, and the thickness of the liquid crystal layer is $d_{1c}=3.0$ μm. Accordingly, $\Delta n_{1c}\cdot d_{1c}=0.24$ μm.

Also in this case, a normally white reflective LCD device with high contrast is achieved by setting the twisting angle $\Omega_{1c}=63.0°$, $\phi_p=45.0°$, and $\phi_f=90.0°$.

Next, measurement results of optical characteristics under the above conditions are shown below. The reflectance was measured using a perfect diffuse light source. The results show that, when observing the reflective LCD device from the front, which is the normal direction, the reflectance was 21.7%, and contrast was 21.3%. Since the color achromatically changes from black to white, the feasibility of a 64 level gradation color display was confirmed.

The LCD device shows no inversion of the gradation until a ±60° change in the viewing angle, thus demonstrating good viewing angle characteristics. In particular, for changes in the right/left direction, there was less change in the viewing angle of the white reflectance, also demonstrating good viewing angle characteristics.

For comparison, the reflective LCD device in the second exemplary embodiment without the color filter layer 64 was created. When observing from the front, the contrast was 22.5%, and the reflectance was 37.4%.

The liquid crystal twisting angle $\Omega_{1c}$ was then changed to examine its characteristics. It was confirmed that the reflective LCD device in the second exemplary embodiment demonstrates good characteristics when the twisting angle was between 0° and 90°. Characteristics are particularly good when the twisting angle $\Omega_{1c}$ was between 60° and 70°.

In the above description, the liquid crystal cell 6 is a twisted nematic liquid crystal cell. However, it is apparent that other types of liquid crystal cell are applicable for implementing this invention. For example, if a homogeneous liquid crystal cell is used as the liquid crystal cell 6, characteristics as good as those of the twisted nematic liquid crystal may be achieved by setting the retardation of the optical compensator 61 to $r_c=102$ nm. If the liquid crystal cell 6 is a hybrid alignment nematic liquid crystal cell, and retardation of the optical compensator 61 is adjusted to $r_c=110$ nm, characteristics as good as those of the twisted nematic liquid crystal are achievable.

In this exemplary embodiment, aluminum is used as the reflective metal electrode. However, the material comprising the electrode is not limited to aluminum. For example, the same effect is achievable by the use of silver for the reflective metal electrode.

Third Exemplary Embodiment

Figure 7:
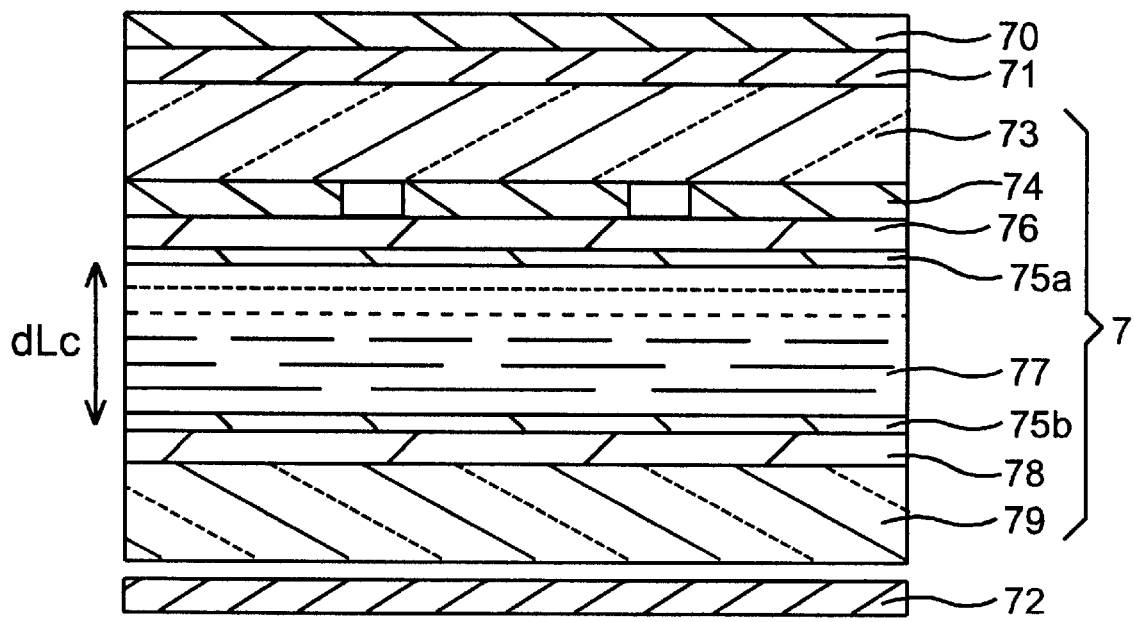
FIG. 7 is brief configuration of a reflective LCD device in accordance with a third exemplary embodiment of the present invention.

FIG. 7 is a sectional view illustrating a brief configuration of a reflective LCD device in a third exemplary embodiment of the present invention. This reflective LCD device is created by laminating the optical compensator 71 and polarizer film 70 in the above order. Details that differ from the second exemplary embodiment are that i) a reflecting function is provided outside the liquid crystal cell as a diffuse reflector 72, ii) a positive hybrid tilt type is employed as an optical compensator, and iii) liquid crystal is operated in the normally black mode.

The liquid crystal cell 7 comprises an upper transparent substrate 73 and lower transparent substrate 79. A color filter layer 74, transparent electrode 76, and orientation layer 75a are provided on the upper transparent substrate 73. A transparent electrode 78 and orientation layer 75b are provided on the lower transparent substrate 79. Liquid crystal is enclosed between the orientation layers 75a and 75b to form a liquid crystal layer 77.

The process for manufacturing this reflective liquid crystal device is similar to that used in the second exemplary embodiment. However, the transparent electrode 78 made of ito as the pixel electrode is formed on the lower transparent substrate 79, and a silver diffuse reflector is applied as the diffuse reflector 72, underneath the lower transparent substrate 79 after completing the liquid crystal cell.

Retardation $r_c$ of the optical compensator 71 is determined to accomplish the following relation:

$$r_{on}+r_c=(m+1)\cdot\lambda/2 (m=0, 1, 2 \ldots )$$

where $r_{on}$ is retardation of the liquid crystal when the effective voltage $v_{on}$ is applied to the liquid crystal cell 7, and the optical wavelength is $\lambda$.

This relation is preferably satisfied in the visible wavelengths (380 nm$\leq\lambda\leq$780 nm).

Here, since the retardation $r_{on}$ of the liquid crystal when the effective voltage $v_{on}$=5 v is applied to the liquid cell 7 was 40 nm and when m=0, retardation of the optical compensator 71 is adjusted to $r_c$=235 nm. This enables a normally black reflective LCD device with high contrast to be achieved.

The optical compensator 71 employed in this exemplary embodiment is a positive hybrid tilt type, the same type used in the first exemplary embodiment and shown in FIGS. 2(a) and 2(b).

Also in this case, a normally black reflective LCD device with high contrast is achieved by setting the twisting angle $\Omega_{1c}$=63.0°, $\emptyset_p$=45.0°, and $\emptyset_f$=90.0°.

Next, optical characteristics under the above conditions were measured. The reflectance was measured using a perfect diffuse light source.

Figure 8:
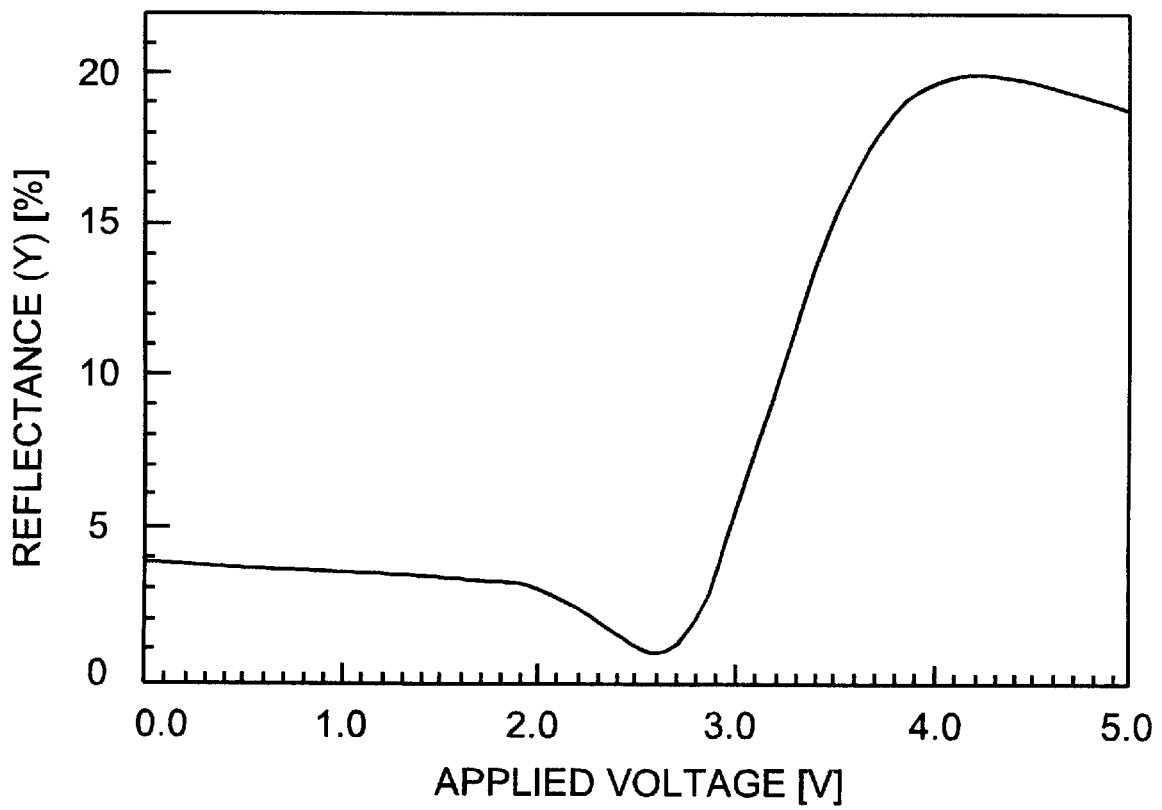
FIG. 8 illustrates the relation between the reflectance and applied voltage in the reflective LCD device in accordance with the third exemplary embodiment of the present invention.

FIG. 8 shows the relation between the reflectance of the reflective LCD device in the third exemplary embodiment and applied voltage. When observing the reflective LCD device from the front, the reflectance was 20.8%, and contrast was 23.1%. Since the color achromatically changes from black to white, the feasibility of a 64 level gradation color display was confirmed.

The device shows no inversion of the gradation until ±60° C. change in the viewing angle, thus demonstrating good viewing angle characteristics. In particular, for changes in the right/left direction, there was less change in the viewing angle of the white reflectance, also demonstrating good viewing angle characteristics.

For comparison, the reflective LCD device in the third exemplary embodiment without the color filter layer 74 was created. When observing from the front, the contrast was 24.1%, and the white reflectance in y value was 36.8%.

The liquid crystal twisting angle $\Omega_{1c}$ was then changed to examine its characteristics. It was confirmed that the reflective LCD device in this exemplary embodiment demonstrates good characteristics when the twisting angle was between 0° and 90°. Characteristics are particularly good when the twisting angle $\Omega_{1c}$ is between 60° and 70°.

In the above description, the liquid crystal cell 7 is a twisted nematic liquid crystal cell. However, it is apparent that other types of liquid crystal cell are applicable to this invention. For example, if a homogeneous liquid crystal cell is used as the liquid crystal cell 7, characteristics as good as those of the twisted nematic liquid crystal may be achieved by setting the retardation of the optical compensator 71 to $r_c$=240 nm.

If the liquid crystal cell 7 is a hybrid alignment nematic liquid crystal cell, and retardation of the optical compensator 71 is adjusted to $r_c$=245 nm, characteristics as good as those of the twisted nematic liquid crystal may also be achieved.

If a homeotropic liquid crystal cell with dielectric constant anisotropy $\Delta\varepsilon$=−5.1 is employed as the liquid. crystal cell 7, retardation of the optical compensator 71 is set to $r_c$=40 nm. In this case, good characteristics matching those of twisted nematic liquid crystal are achieved.

Accordingly, if the liquid crystal layer contains nematic liquid crystal with negative dielectric constant anisotropy, $r_{on}$ may preferably satisfy the following conditions:

$$220 \text{ nm} < r_{on} \leq 260 \text{ nm}$$

With this configuration, good characteristics with further high contrast are achievable. In addition, $r_{on}$ may ideally be between:

$$230 \text{ nm} < r_{on} \leq 250 \text{ nm}$$

For applying the diffuse reflector 72 underneath the lower transparent substrate 79, an air layer is formed by not adhering the diffuse reflector 72 to the lower transparent substrate 79. It was confirmed that the extended diffusion effect enables improved natural viewing angle characteristics due to the difference between the resin refractive index (about 1.6) and the air refractive index (1.0).

In this exemplary embodiment, silver is used as the reflective metal electrode. However, the material comprising the electrode is not limited to silver. For example, the same effect is achievable by the use of aluminum for the reflective metal electrode.

Fourth Exemplary Embodiment

Figure 9:
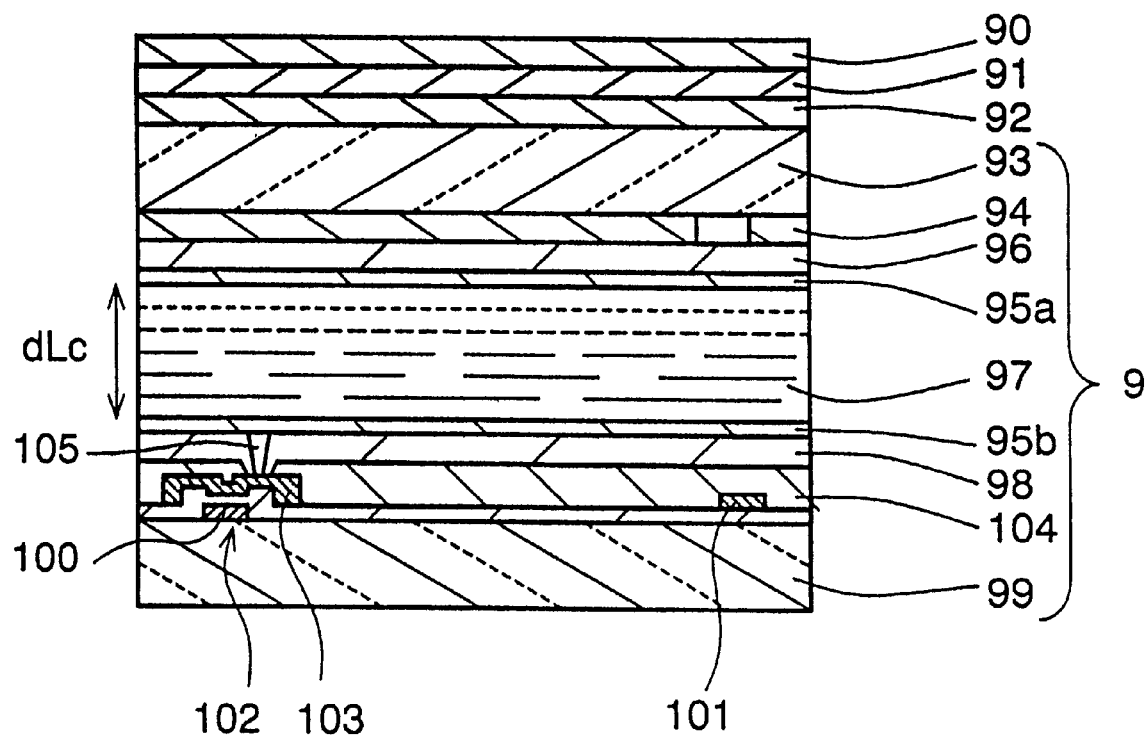
FIG. 9 is a brief configuration of a reflective LCD device in accordance with a fourth exemplary embodiment of the present invention.

FIG. 9 is a sectional view of a brief configuration of a reflective LCD device in a fourth exemplary embodiment of the present invention. This reflective LCD device is created by laminating a scattering film layer 92, optical compensator 91, and polarizer film 90 on one side of the liquid crystal cell 9 in the above order. Details that differ from the first exemplary embodiment are that i) a non-linear switching device for active driving is provided on the lower substrate, ii) a negative hybrid tilt type is employed as the optical compensator 91, and iii) liquid crystal is operated in the normally black mode.

The liquid crystal cell 9 comprises an upper transparent substrate 93 and lower substrate 99. A color filter layer 94, transparent electrode 96, and orientation layer 95a are provided on the upper transparent substrate 93. A reflective metal electrode 98 and orientation layer 95b are provided on the lower substrate 99. Liquid crystal is enclosed between the orientation layers 95a and 95b to form a liquid crystal layer 97. The lower substrate 99 is not required to be transparent.

The reflective liquid crystal device in the fourth exemplary embodiment is actively driven by the non-linear switching device, and the reflective metal electrode 98 is electrically connected to a thin film transistor (TFT) device 102 underneath a flattening film 104 through a contact hole 105. This configuration improves the aperture rate, thus increasing the light usage rate. The other components are a gate electrode 100, source electrode 101, and drain electrode 103.

The process for manufacturing the above reflective LCD device is described next.

A non-alkaline glass substrate (e.g. 1737, Corning, Inc.) is employed as the upper transparent substrate 93 and lower substrate 99. The color filter layer 94 and transparent electrode 96 are formed in the same way as in the first exemplary embodiment on the upper transparent substrate 93.

On the lower substrate 99, the gate electrode 100 made of aluminum and tantalum, the source electrode 101 made of titanium and aluminum, and the drain electrode 103 are disposed in a matrix using conventional methods, and the TFT device 102 made of amorphous silicon is formed at each crossing area of the gate electrode 100 and source electrodes 101.

To form the flattening film 104, positive photosensitive acrylic resin (e.g. FVR, Fuji Chemical Industries Co.). Is applied over the entire face of the lower substrate 99 where the non-linear device is formed. Then, an ultraviolet ray is irradiated, using a predetermined photomask, to form the contact hole 105 on the flattening film 104 over the drain electrode 103.

An 80 nm thick titanium layer followed by a 200 nm thick aluminum layer is then deposited to form the reflective mirror metal electrode 98.

Next, the orientation layers 95a and 95b are formed on the transparent electrode 96 and the reflective metal electrode 98, respectively, in the same way as in the first exemplary embodiment.

After the upper transparent substrate 93 and lower substrate 99 are mutually bonded in the same way as in the first exemplary embodiment, liquid crystal is vacuum injected between the substrates. As for liquid crystal, the fourth exemplary embodiment employs fluorocarbon ester type nematic liquid crystal with refractive anisotropy of $\Delta n_{1c}=0.08$ which is mixed with a predetermined amount of chiral liquid crystal. After injecting liquid crystal, the inlet is sealed with ultraviolet curable resin, and cured by ultraviolet irradiation.

On the upper transparent substrate of the liquid cell 9, an isotropic forward scattering film is attached as the scattering film layer 92. The optical compensator 91 is attached on the scattering film layer 92 in a way to set the optical slow axis to a predetermined angle. Then, neutral gray polarizing film (sq-1852ap), pre-treated for antiglare (ag) and antireflection (ar), is attached on the optical compensator 91 so that its absorption axis makes a predetermined angle with the optical slow axis of the optical compensator 91.

Retardation $r_c$ of the optical compensator 91 is determined to accomplish the following relation:

$$r_{on}+r_c=(m+1)\cdot\lambda/2 (m=0, 1, 2 \ldots)$$

where $r_{on}$ is retardation of the liquid crystal when the effective voltage $v_{on}$ is applied to the liquid crystal cell 9, and the optical wavelength is $\lambda$.

This relation is preferably satisfied in the visible wavelengths (380 nm $\leq \lambda \leq$ 780 nm).

Here, since the retardation $r_{on}$ of the liquid crystal when the effective voltage $v_{on}$=5 v is applied to the liquid cell 9 was 40 nm and when m=0, retardation $r_c$ of the optical compensator 91 is adjusted to $r_c$=235 nm. This enables a normally black reflective LCD device with high contrast to be achieved.

The optical compensator 91 employed in this exemplary embodiment is a negative hybrid tilt type which has the optical slow axis, looking from the front, i.e. normal direction, and its refractive indexes nx, ny, and nz satisfy the relation of nx≈ny>nz and ny is in the face of the optical compensator 91. When this optical compensator 91 is seen from the ny direction, nz is tilted to 5° on one face and 90° on the other face of the optical compensator 91, as shown in FIG. 6(b), and the tilt angle continuously changes in between. The tilt angle of the refractive index nz is not limited to these angles. However, the tilt angle preferably fall within 0° to 10° on one face and 60° to 90° on the other face of the optical compensator 91.

Also in this case, a normally black reflective LCD device with high contrast is achieved by setting the twisting angle $\Omega_{1c}$=63.0°, $\phi_p$=45.0°, and $\phi_f$=90.0°.

Next, optical characteristics were measured under the above conditions. The reflectance was measured using a perfect diffuse light source. As a result, when observing the reflective LCD device in this exemplary embodiment from the front, the reflectance was 21.1%, and contrast was 24.0%. Since the color achromatically changes from black to white, the feasibility of a 64-level gradation color display was confirmed.

The device shows no inversion of the gradation until a ±60° change in the viewing angle, thus demonstrating good viewing angle characteristics. In particular, for changes in the right/left direction, there was less change in the viewing angle of the white reflectance, also demonstrating good viewing angle characteristics.

For comparison, the reflective LCD device in the fourth exemplary embodiment without the color filter layer 94 was created. When observing from the front, the contrast was 24.7%, and the reflectance was 37.1%.

The contrast is improved by active driving. It is apparent that the effect of active driving also improves other display qualities including reduction of crosstalk and improvement of response speed.

The liquid crystal twisting angle $\Omega_{1c}$ was then changed to examine its characteristics. It was confirmed that the reflective LCD device in this exemplary embodiment demonstrates good characteristics when the twisting angle was between 0° and 90°. Characteristics are particularly good when the twisting angle $\Omega_{1c}$ was between 60° and 70°.

In the above description, the liquid crystal cell 9 is a twisted nematic liquid crystal cell. However, it is apparent that other types of liquid crystal cell are applicable to this invention. For example, if a homogeneous liquid crystal cell is used as the liquid crystal cell 9, characteristics as good as those of the twisted nematic liquid crystal may be achieved by setting the retardation of the optical compensator 91 to $r_c$=240 nm.

If the liquid crystal cell 9 is a hybrid alignment nematic liquid crystal cell, and retardation of the optical compensator 91 is adjusted to $r_c$=245 nm, characteristics as good as those of the twisted nematic liquid crystal may also be achieved.

If a homeotropic liquid crystal cell with dielectric constant anisotropy $\Delta\epsilon=-5.0$ is employed as the liquid crystal cell 9, retardation of the optical compensator 91 is set to $r_c=40$ nm. In this case, good characteristics matching those of twisted nematic liquid crystal are achieved.

Without being limited to the fourth exemplary embodiment, an active drive reflective LCD device is achievable by forming non-linear devices such as TFTs onto one substrate in all the above exemplary embodiments. As for the non-linear device, two-terminal devices (mim or thin film diode) and polysilicon TFTs as well as amorphous silicon TFTs may be employed to achieve the same effect.

As described above, the present invention enables the achievement of a reflective LCD device with brighter and higher contrast which enables achromatic black and white changes, a monochrome display in a normally white or normally black state with reflectance less affected by changes in viewing angle, and multicolor gradation displays.

What is claimed is:

1. A reflective liquid crystal display device comprising:
    a liquid crystal cell having a pair of first and second substrates, and a liquid crystal layer between the pair of substrates;
    a sheet of polarizer film on the first substrate;
    optically reflecting means disposed on the second substrate; and
    a hybrid tilt optical compensator, either positive or negative, between the polarizer film and the liquid crystal layer, the optical compensator having an optically slow axis when viewed from the direction normal to the compensator, the retardation, Rc, of the compensator satisfying one of the equations:

$$Ron+Rc=\lambda/4+m19\ \lambda/2 (m=0,1,2\ldots);$$

and $$Ron+Rc=(m+1)\cdot\lambda/2 (m=0,1,2\ldots),$$

where Ron is the retardation of the liquid crystal layer when an effective voltage Von is applied to said liquid crystal cell, and $\lambda$ is the optical wavelength;

and, refractive indexes nx, ny, and nz of said optical compensator satisfy the equation $$nx>ny\approx nz$$

where ny is in an in-plane direction of the optical compensator; the nx of the optical compensator has a tilt angle of 0° to 10° on one side and 60° to 90° on the other side when viewing the optical compensator from the ny direction, and the tilt angle continuously changing within the range of 0°–10° on one side and 60° to 90° on the other side.

2. The device of claim 1, wherein the optically reflecting means is a reflective metal electrode in the liquid crystal cell, the reflective metal electrode having a diffuse reflective surface for diffuse-reflecting incident light.

3. The device of claim 1, wherein the second substrate is a transparent substrate, and the optically reflecting means is a diffuse reflector outside the second substrate.

* * * * *